(12) United States Patent
Sridhara et al.

(10) Patent No.: US 7,864,471 B2
(45) Date of Patent: Jan. 4, 2011

(54) CONVERTING TIMING ERRORS INTO SYMBOL ERRORS TO HANDLE WRITE MIS-SYNCHRONIZATION IN BIT-PATTERENED MEDIA RECORDING SYSTEMS

(75) Inventors: Deepak Sridhara, Pittsburgh, PA (US); Ching He, Allison Park, PA (US); Arvind Sridharan, Longmont, CO (US); Raman Venkataramani, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 217 days.

(21) Appl. No.: 12/178,880

(22) Filed: Jul. 24, 2008

(65) Prior Publication Data

US 2010/0020429 A1    Jan. 28, 2010

(51) Int. Cl.
G11B 5/09    (2006.01)

(52) U.S. Cl. .................. 360/51; 360/53; 360/60

(58) Field of Classification Search ............. None
See application file for complete search history.

(56) References Cited

U.S. PATENT DOCUMENTS

| | | | |
|---|---|---|---|
| 3,689,899 A | 9/1972 | Franaszek | |
| 4,675,652 A | 6/1987 | Machado | |
| 4,730,321 A | 3/1988 | Machado | |
| 5,034,741 A | 7/1991 | Barzach | |
| 5,373,513 A | 12/1994 | Howe et al. | |
| 7,405,678 B2 * | 7/2008 | Cherubini | 341/51 |
| 7,492,540 B2 * | 2/2009 | Albrecht | 360/51 |
| 7,679,852 B2 * | 3/2010 | Shaver et al. | 360/51 |
| 7,787,205 B2 * | 8/2010 | Kuznetsov et al. | 360/53 |
| 2009/0002868 A1 * | 1/2009 | Mallary et al. | 360/55 |
| 2009/0003144 A1 * | 1/2009 | Mallary et al. | 369/30.21 |

OTHER PUBLICATIONS

E. Ratzer et al, "Codes for Channels with Insertions, Deletions and Substitutions", Proceedings of the International Symposium on Turbo Codes and Related Topics, 2000, 8 pgs., Brest, France.
D. J. C. Mackay, "An Alternative to Runlength-limiting Codes: Turn Timing Errors into Substitution Errors", Sep. 2, 2000, 3 pgs.
M. C. Davey et al., "Reliable Communication over Channels with Insertions, Deletions and Substitutions", IEEE Transactions on Information Theory, Feb. 2001, 13 pgs., vol. 47, No. 2.
Z. A. Keirn et al., "Use of Redundant Bits for Magnetic Recording: Single-Parity Codes and Reed-Solomon Error-Correcting Code," IEEE Transactions on Magnetics, Jan. 2004, pp. 225-230, vol. 40, No. 1.
J. Hu et al., "Information Rates for Generalized Insertion and Deletion Channels", Submitted to IEEE Transactions on Information Theory, pp. 1-23.

* cited by examiner

Primary Examiner—Jason C Olson
(74) Attorney, Agent, or Firm—Robert P. Lenart, Esq.; Pietragallo Gordon Alfano Bosick & Raspanti, LLP

(57) ABSTRACT

A method includes: writing data to a bit-patterned media at times determined by a clock having a period that is offset from a bit island period by a fixed offset to create one insertion or one deletion approximately within a predetermined number of bit islands, reading the data, and correcting the read data using error correction. An apparatus that implements the method is also provided.

20 Claims, 8 Drawing Sheets

CONVERTING TIMING ERRORS INTO SYMBOL ERRORS TO HANDLE WRITE MIS-SYNCHRONIZATION IN BIT-PATTERENED MEDIA RECORDING SYSTEMS

BACKGROUND

This invention relates generally to data storage devices that include patterned media, wherein each data bit is stored in a magnetically isolated block on the media, and more particularly to a method and apparatus for converting timing errors into symbol errors to manage write mis-synchronization in bit-patterned media recording systems.

Magnetic recording hard disc drives with bit-patterned magnetic recording media have been proposed to increase data density. In patterned media, the magnetic material on the disc is patterned into small isolated blocks or islands such that there is a single magnetic domain in each island or "bit".

In a bit-patterned media (BPM) magnetic storage system, the loss of write synchronization can introduce catastrophic errors and render the system useless. If the write head clock is not perfectly aligned with the bit islands, bit insertions or deletions can occur during the writing process. Existing error correction code (ECC) schemes and read channel architectures in a magnetic storage system are designed to only correct substitution errors. Hence, even a single insertion or deletion can result in a catastrophic propagation of bit errors in the system as interpreted by these read channel architectures.

SUMMARY

In one aspect, this invention provides a method including: writing data to a bit-patterned media at times determined by a clock having a period that is offset from a bit island period by a fixed offset to create one insertion or one deletion approximately within a predetermined number of bit islands, reading the data, and correcting the read data using error correction.

In another aspect, the invention provides an apparatus including a write channel for writing data to a bit-patterned media at times determined by a clock having a period that is offset from a bit island period by a fixed offset to create one insertion or one deletion approximately within a predetermined number of bit islands, and a read channel for reading the data and correcting the read data using error correction.

DETAILED DESCRIPTION OF THE INVENTION

Figure 1:
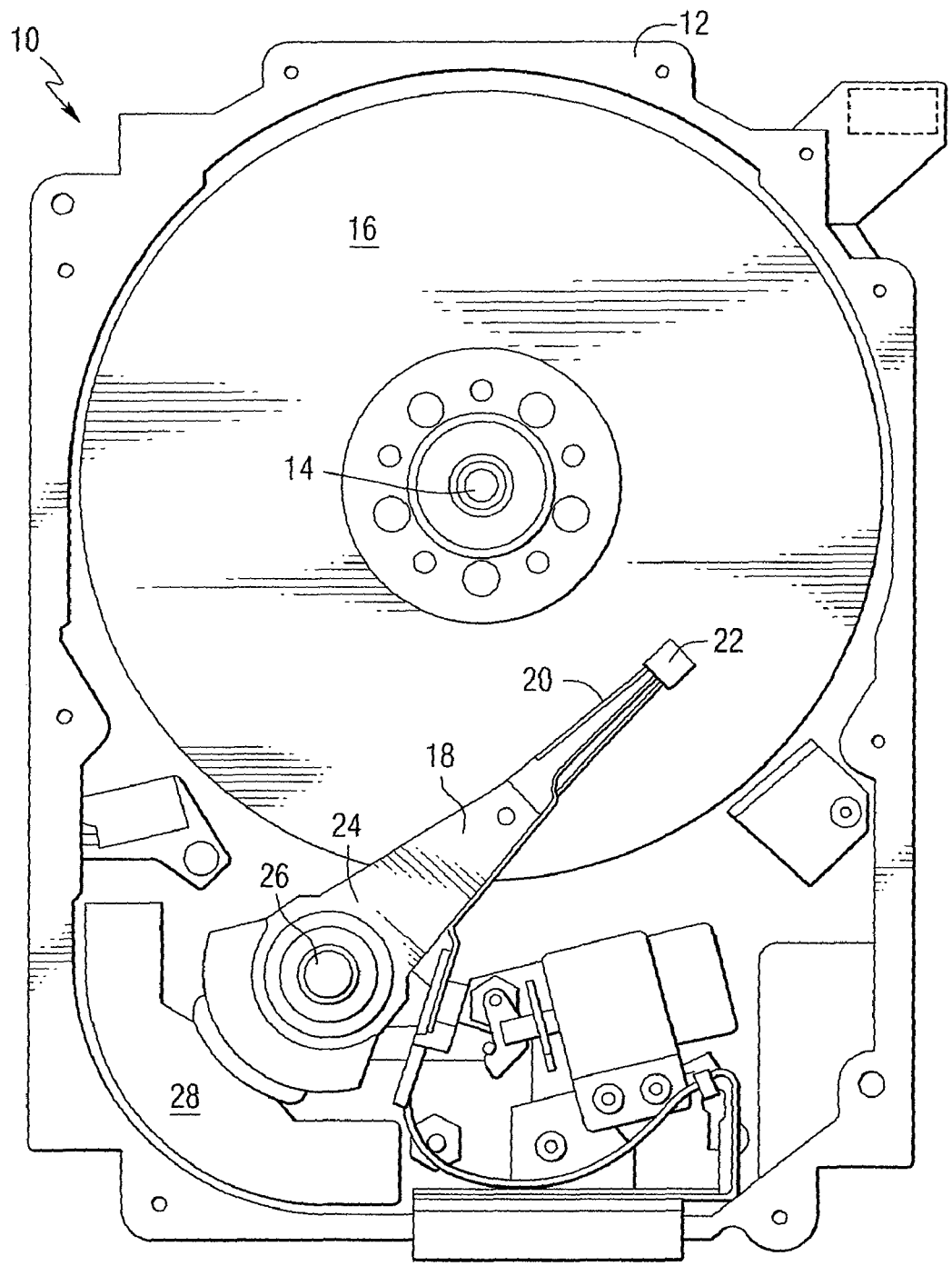
FIG. 1 is a schematic representation of a data storage device constructed in accordance with an aspect of the invention.

FIG. 1 is a pictorial representation of a data storage device in the form of a disc drive 10 that can be constructed in accordance with an aspect of the invention. The disc drive includes a housing 12 (with the upper portion removed and the lower portion visible in this view) sized and configured to contain the various components of the disc drive. The disc drive includes a spindle motor 14 for rotating at least one data storage media 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art. The controller can further include circuitry that controls the read and write functions performed when reading data from the storage media and writing data to the storage media.

Figure 2A:
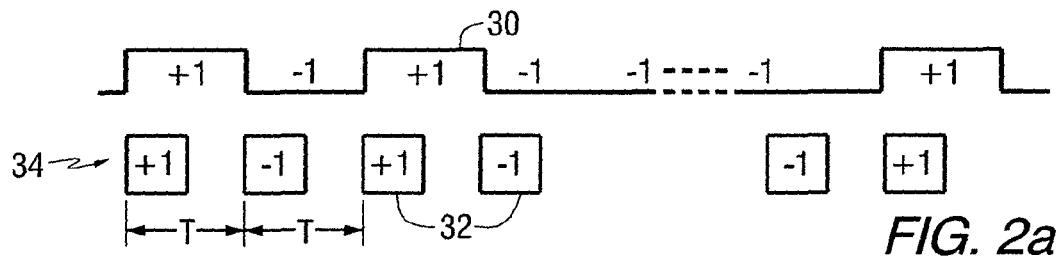
FIGS. 2*a*, 2*b* and 2*c* are graphs that illustrate write synchronization in a storage device that includes bit-patterned media.

The timing of writing data to the media is controlled by a write head clock. Where the storage media is a bit-patterned media (BPM), the media comprises a plurality of bit islands where each bit island can be magnetized to store a single bit, and the bit islands are separated by non-magnetic material called "trenches". FIG. 2*a* schematically illustrates write synchronization in a storage device that includes bit-patterned media. In FIG. 2*a*, line 30 represents a write field produced by a write transducer in the recording head. The write field is applied to a plurality of bit islands 32 arranged in a track 34. The +1's and −1's represent directions of magnetization that are imposed on the bit islands. The bit islands are regularly spaced apart by a distance T. In operation, relative movement is provided between the recording head and media.

Since the recording layer of the BPM is not continuous, the write head clock, which controls the timing of the write field pulses, must be perfectly aligned with the bit islands as shown in FIG. 2*a* in order to avoid not writing a bit (i.e., deleting a bit) or writing a bit more than once (i.e., inserting a bit). Even a very small frequency offset in the write head clock or position jitter in the location of the bit islands can eventually cause the write head to try to write a bit in the portion of the media that is non-magnetic, thus causing the bit to be deleted, or can cause the write head to write a bit on two or more consecutive bit islands, thus causing insertions of the same bit more than once.

In one aspect, this invention provides a coding solution and a read channel designed to handle the effects of misalignment between the write head clock and the bit islands, and to correct for insertion, deletion, and substitution errors. In one example, the write head clock frequency is deliberately offset from the bit island frequency so as to introduce only insertions (or, only deletions) in the bit stream at the time of writing. This offset is selected so that in approximately every M bit islands, there is one insertion (or, one deletion).

Coding techniques are provided to take advantage of the knowledge that there is one insertion (or, one deletion) approximately every M positions. The techniques use an outer error correction code (ECC) and an inner modulation code in the write channel of the data storage system. The insertions and deletions that occur during writing are handled in the read channel of the system. A read sensor, or detector, detects the magnetic field in the bit islands and produces output pulses, which are converted to digital bits. The combination of the detector and an inner decoder transforms the insertion/deletion errors into bit errors (i.e., substitution errors) for the outer ECC decoder. Thus, a conventional outer ECC designed to correct for erasures and substitution errors is able to correct for all the errors in the system.

One of the coding solutions turns synchronization errors into symbol errors. The insertion/deletion model that is used in the described examples is pertinent to various BPM systems, including for example, disc drives and probe storage devices. The described detection and decoding methods can handle both random bit errors caused at low-to-moderate signal-to-noise ratios (SNRs) in the system, and insertion/deletion errors caused by misalignment between the write head clock and the bit islands in the BPM system.

In the following description, issues due to the lack of write synchronization in BPM systems are addressed first, followed by a read channel design to handle the effects of insertion/deletion errors due to write mis-synchronization, and the effects of inter-symbol-interference (ISI), defects, burst errors, and electronics noise as found in conventional magnetic storage systems.

Figure 2B:
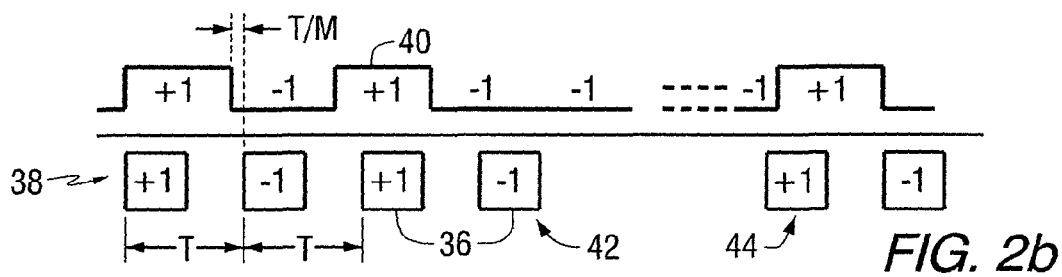

FIG. 2b shows a scenario wherein the bit islands 36 in a track 38 are separated by a period T, and the write head clock 40 is offset from the bit island period by a fixed offset T/M, for some integer M. Assuming the bit islands are correctly aligned with a frequency of occurrence of 1/T, the fixed frequency offset between the write head clock and the bit island frequency causes a deletion (or respectively, an insertion) once for every M bit islands if the write head clock frequency is larger (or respectively, smaller) than the bit island frequency. In FIG. 2b, a deletion has occurred between bit islands 42 and 44.

Figure 2C:
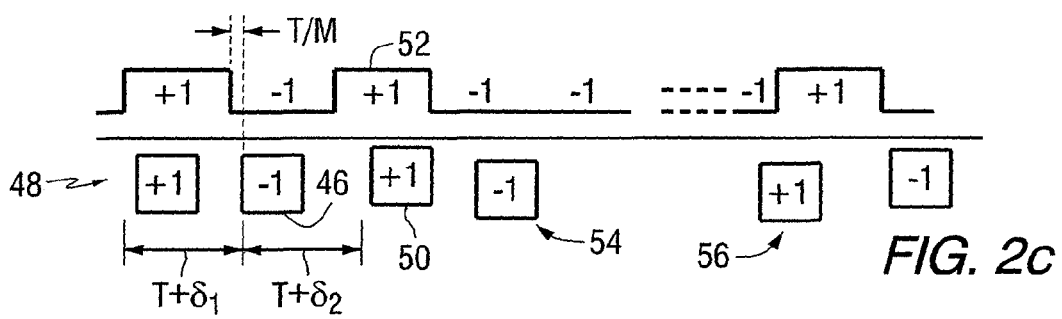

FIG. 2c shows the case when the bit islands 46 are not perfectly aligned in track 48 with frequency 1/T; rather, there is some misalignment (or, position jitter) in the location of these bit islands, as illustrated by bit island 50. Assuming that the period of the write head clock 52 is T±T/M, and that the offset T/M is significantly more than the position jitter variance in the bit island locations, then the write head clock offset causes a deletion/insertion approximately (and not exactly) once every M bit islands. In FIG. 2c, a deletion has occurred between bit islands 54 and 56. Exactly aligning the write clock with the bit islands is an extremely challenging task. Hence, the invention described herein provides a way to combat the lack of write synchronization by modifying the read channel architecture.

To ameliorate the effects of write mis-synchronization as described above, the write clock period is deliberately offset by T/M from T for some suitably large number M. This offset ensures that there is only one insertion (or, only one deletion depending on the sign of the offset) approximately every M bit islands. It is approximately every M bit islands and not exactly every M bit islands due to the inherent timing errors and position jitter in the system. However, for typical recording devices used today, the uncertainty can be localized to $[M-\lambda, M+\lambda]$ for a small integer $\lambda$ due to a small frequency offset and position jitter. Typical values for M and $\lambda$ are 100 and 5 corresponding to a fixed frequency offset of 1% and a random frequency offset of 0.05%.

Figure 3:
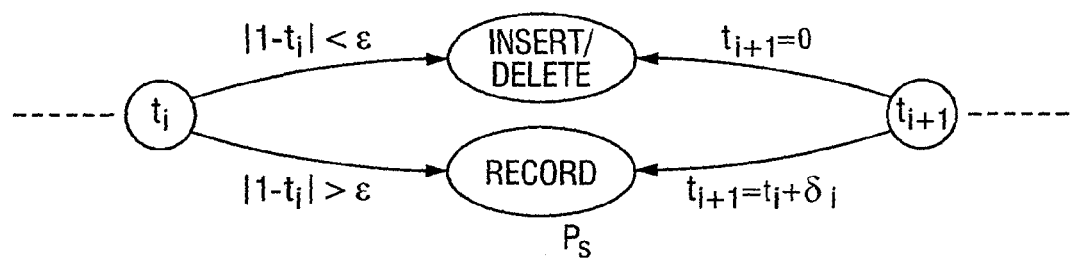
FIG. 3 is a schematic representation of a random walk model for insertion or deletion errors due to write head clock and bit island misalignment in BPM.

The model for insertion or deletion then reduces to the diagram shown in FIG. 3. If the offset between the write clock and the bit islands at a bit island i is $t_i$ (in units of time or length), then the offset at bit island i+1 is $t_{i+1}=t_i+\delta_i$, where $\delta_i$ is modeled as a mean T/M Gaussian random variable with variance $\sigma^2$, T/M represents the fixed offset in the write head clock, and $\sigma^2$ represents the variance in the position jitter associated with the bit island locations and any other inherent timing errors that occur in a recording system. When $t_i$ approaches the design bit island period T, an insertion (or deletion) occurs as shown in FIG. 2b. Thus, the encoder design at the write side and the channel design at the read side need to only correct for these occasional insertion (or, deletion) errors along with the other errors due to inter-symbol-interference (ISI), electronics noise, and media defects.

Two solutions to handle the errors caused due to write mis-synchronization are described herein, one for the case when the signal-to-noise ratio (SNR) is high and the only errors in the system are errors from write mis-synchronization, and the other for the case with low-to-moderate SNRs wherein there are bit errors due to ISI, electronics noise, and timing jitter, in addition to the write mis-synchronization errors.

Figure 4:
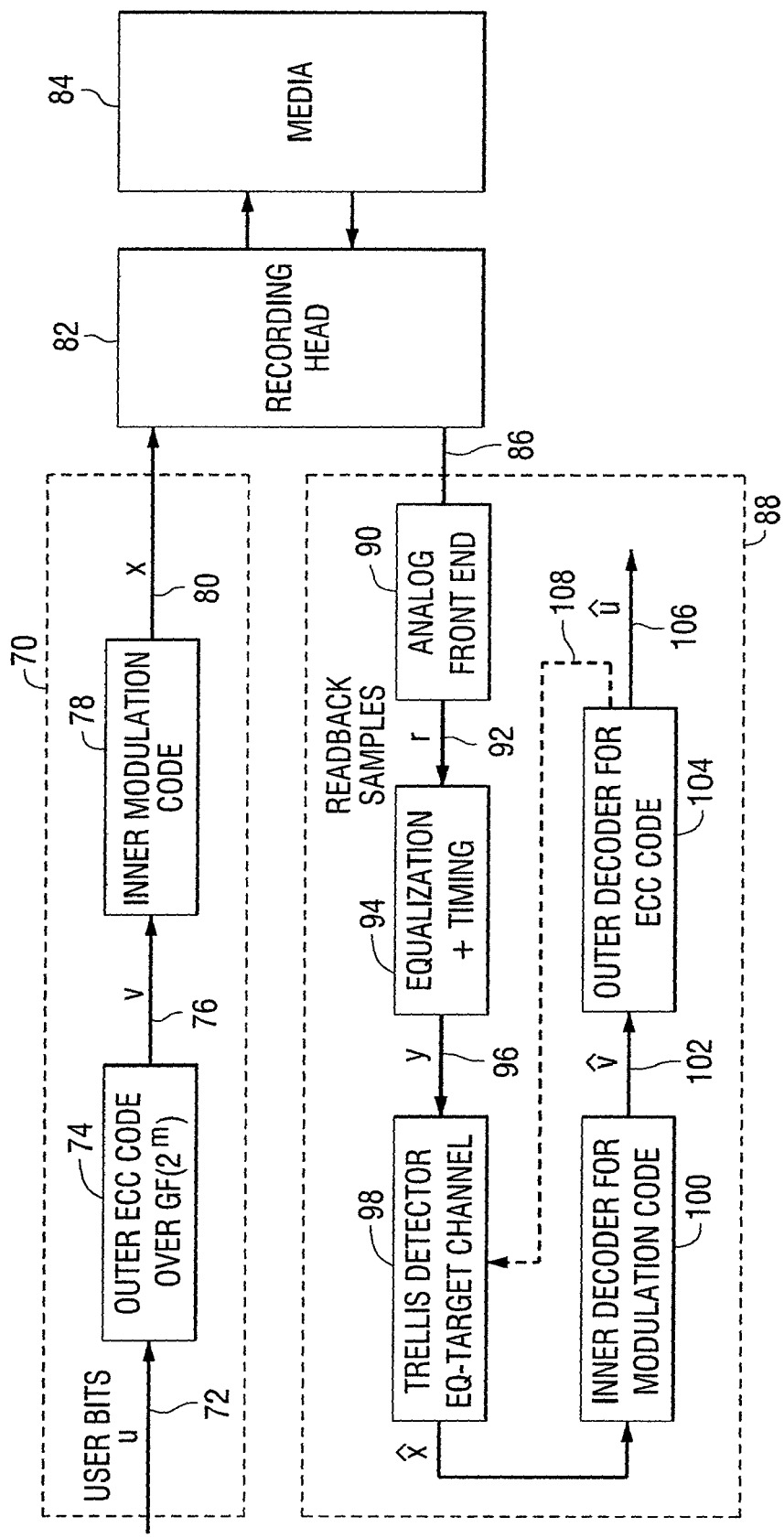
FIG. 4 is a block diagram of a channel model for a bit-patterned media storage device in accordance with an aspect of the invention.

For the high SNR case, the scheme includes an inner modulation code and an outer non-binary ECC code as shown in FIG. 4. FIG. 4 is a block diagram of a channel model for a bit-patterned media storage device in accordance with an aspect of the invention. A write channel 70 receives user bits on line 72 and subjects the user bits to an outer ECC code as shown in block 74. The coded bits on line 76 are then subjected to an inner modulation code as shown in block 78 to produce bits to be written on the storage media on line 80. A recording head 82 receives the bits on line 80 and writes the bits to a bit-patterned media 84. The outer ECC code can be, for example, a Reed-Solomon code or a non-binary LDPC code over $GF(2^m)$ for some integer m. For the sake of simplicity, let $\{1, 2, \ldots, S\}$ represent the symbols of the alphabet (with alphabet size S) for the outer ECC code. Then, a simple inner modulation code is one that maps the symbol i to a run of i zeros or ones depending on whether i appeared as an even symbol or an odd symbol in the output of the outer ECC encoder.

In another example, the outer code can be a binary ECC code. In such a case, groups of bits from the outer LDPC code may be mapped into a non-binary symbol and this non-binary symbol may be mapped into runs of zeros or ones as described above by the inner modulation code.

During the writing process, the write head clock is deliberately made slower than the bit island frequency by a constant offset as explained above so that one insertion is introduced approximately every M positions in the encoded bit stream. Observe that when a bit insertion occurs, the inserted bit is equal to one of the adjacent bits in the bit stream. That is, if a bit is inserted between two 0's, the inserted bit must be a 0; on the other hand, if a bit is inserted between a 1 and a 0, the inserted bit can either be a 1 or a 0.

To read the written bits, a read sensor in the recording head produces a signal on line 86 that is received by a read channel 88. An analog front end 90 converts the signal to read-back samples on line 92. Block 94 shows that the read-back samples are equalized to a target ISI channel as for example in conventional read channel models, and the equalized samples on line 96 are sent through a Viterbi/SOVA detector 98 for the target ISI channel. A decoder 100 receives the output of the Viterbi/SOVA detector 98 and produces the read bits on line 102.

The detector in the read channel architecture is assumed to be able to detect all the written bits without any errors due to the high SNR in the system. Thus, the detector outputs a sequence of bits that correspond to the encoded sequence from the inner modulation code, but with insertion errors that occurred during writing.

Figure 5:
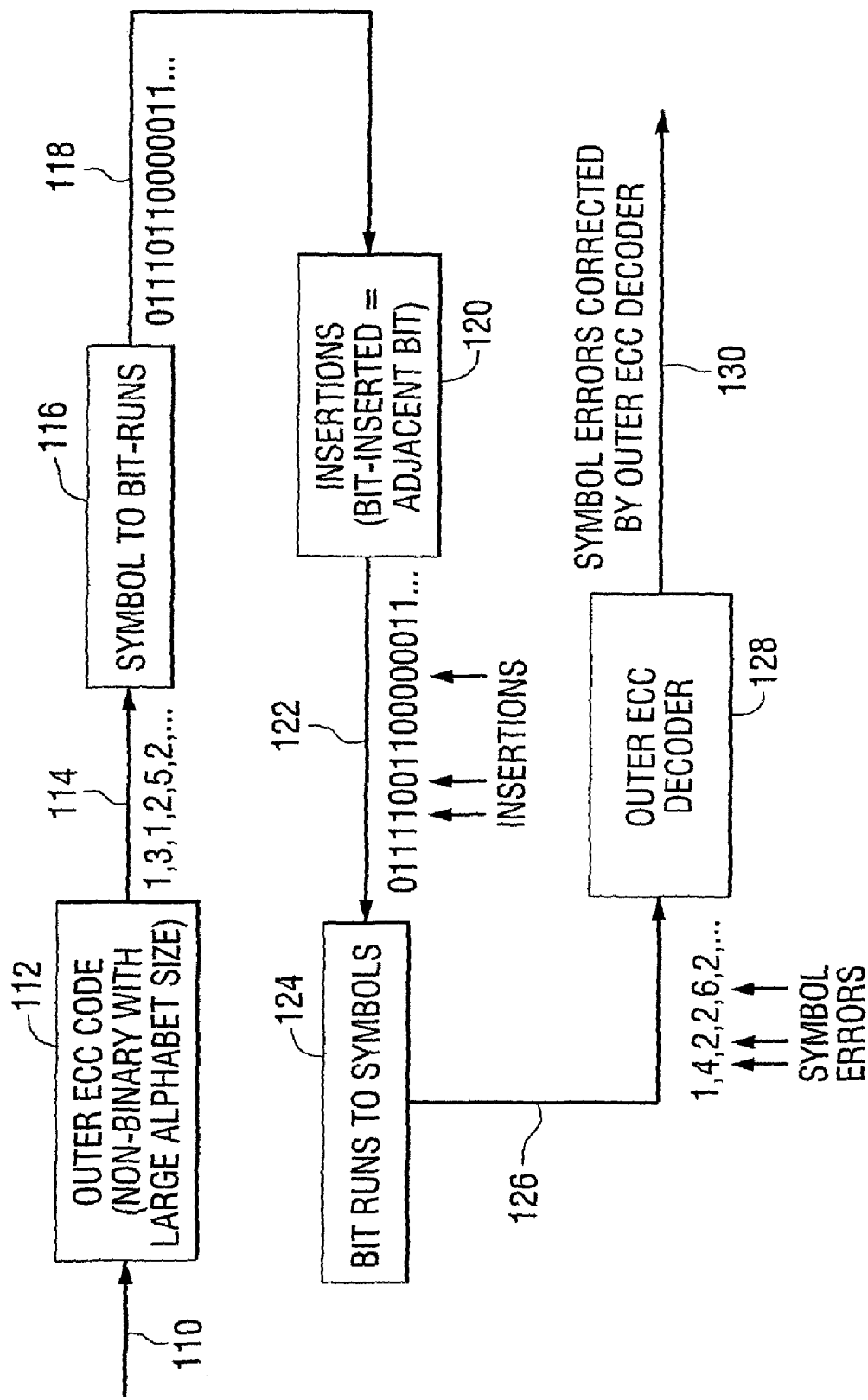
FIG. 5 is a block diagram that illustrates insertions and a decoder for the channel model in FIG. 4.

In one example, a code word sequence at the output of the outer ECC encoder of the form 1, 2, 4, 1, 5, 3, 1, . . . is encoded into the bit stream 0,11,0000,1,00000,111,0,1 . . . by the inner modulation code as shown in FIG. 5.

User bits on line 110 are subjected to an outer ECC code as shown in block 112 to produce a code word sequence on line 114. The code word sequence on line 114 is then subjected to an inner modulation code as described above and shown in block 116 to produce bits to be written on the storage media on line 118. Insertions are added as shown in block 120 to produce a modified bit sequence on line 122. The modified bit sequence represents bits that are stored on the storage media.

To read the written bits, a read sensor in the recording head produces a signal that is processed using known techniques to produce a sequence of bits representative of the bits stored on the storage media. Bit runs in this sequence are converted to symbols as shown in block 124. The symbols on line 126 include errors that are corrected by an outer ECC decoder 128 to produce output symbols on line 130.

The detected bits are mapped back to symbols for the outer ECC decoder by computing the run lengths of alternate 0's and 1's in the detected bits. Thus, a sequence 01111001100000011, . . . is mapped to 1, 4, 2, 2, 6, 2, . . . . If the run length of a stream of 0's or 1's exceeds the alphabet size of the outer code, the insertions can be assumed to occur at these positions and the run length can be mapped to S, where S is also the alphabet size of the outer ECC. Comparing this sequence with the encoded sequence shown in FIG. 5, reveals that the second, the third, and the fifth symbols are in error. Thus, any insertion errors in the system appear as symbol errors to the outer ECC decoder. Using a classical Reed-Solomon code or a non-binary LDPC code over GF($2^m$) appears to be a good choice for the outer ECC as these codes can effectively correct symbol errors and erasures. The high SNR architecture can correct for insertion/deletion errors assuming that there are no bit errors at the output of the detector.

For an outer ECC code of rate $r_{out}$ and alphabet size S, the overall code rate of the system is $$2r_{out}\left(\frac{\log_2(S)}{S+1}\right).$$

Even for a small value of S, say S=4, and a large value for $r_{out}$, say $r_{out}$=0.9, the overall rate of the system is only 0.72. To improve the rate further, iterative decoding between the outer ECC and the inner modulation and ISI detector may be allowed, and the outer ECC decoder may be allowed to convey soft information to the detector, thereby allowing for a larger rate outer ECC code to be used in the system. For S=4, the code rate of the inner modulation code described above is the best possible.

In general, the choice of the inner modulation code may be improved as follows: map each symbol i, for i=1, 2, . . . , S from the outer ECC to a sequence of bits $b_i$ of length between 1 and m, for a chosen integer m. Doing an exhaustive search for the bit sequences $b_i$ for a fixed alphabet set 1, . . . , S and fixed m, under the constraint that insertions once every M bit positions are transformed to symbol errors in the outer ECC code, can improve both the rate and the performance of the above solution.

At low-to-moderate SNRs, the output of the detector in FIG. 5 yields a bit stream that has insertions and bit errors compared to the output of the inner modulation code at the write side. The solution proposed for the high SNR scenario will not work since a bit error can result in a catastrophic error propagation causing the outer ECC to fail. For example, a single bit error can cause the inner decoder to produce a sequence of symbols that is longer than the block length of the outer ECC decoder. Therefore, an alternate architecture as shown in FIG. 6 can be used.

Figure 6:
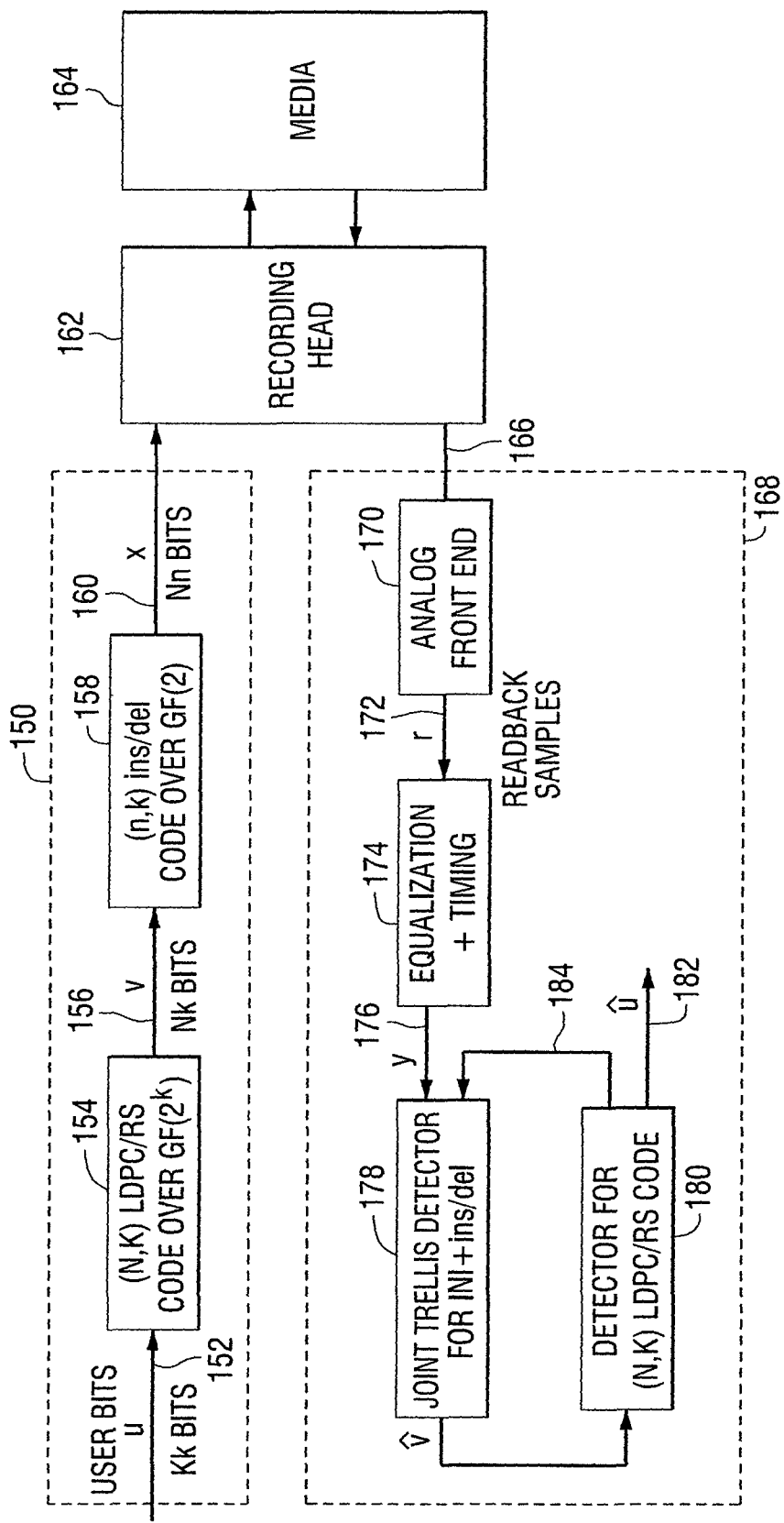
FIG. 6 is a block diagram of a channel model for a bit-patterned media storage device in accordance with another aspect of the invention.

FIG. 6 is a block diagram of a channel model for a bit-patterned media storage device in accordance with another aspect of the invention. A write channel 150 receives user bits on line 152 and subjects the user bits to an outer ECC code as shown in block 154. The coded bits on line 156 are then subjected to an inner ECC as shown in block 158 to produce bits to be written on the storage media on line 160. A recording head 162 receives the bits on line 160 and writes the bits to a bit-patterned media 164.

At the write side, the user bits are first encoded using an outer [N, K] ECC code. The outer code can be a binary ECC code or a non-binary ECC code such as a Reed-Solomon (RS) or low-density parity-check (LDPC) code. The symbols/bits from the outer ECC code are grouped into segments that are k bits long. Each sequence of k bits is then encoded by an inner [n,k] modulation or ECC code. The encoded bits are then written on to the patterned media. The write clock is slower than the bit island frequency by a fixed offset so that there is an insertion approximately once every M positions.

To read the written bits, a read sensor in the recording head produces a signal on line 166 that is received by a read channel 168. An analog front end 170 converts the signal to read-back samples on line 172. Block 174 shows that the read-back samples are equalized to a target ISI channel as for example in conventional read channel models, and the equalized samples on line 176 are sent through a Viterbi/SOVA detector 178 for the target ISI channel. A decoder 180 receives the output of the Viterbi/SOVA detector 178 and produces the read bits on line 182. If turbo style iterative decoding is used, the output of the outer decoder (or the inner decoder) can be fed back to the trellis detector on line 184.

At the read side, the read-back samples are equalized and detected by a trellis detector designed for the target channel. The detected bits have both insertion and substitution errors. It is assumed that the position of the first insertion can be located accurately. This can be ensured by a number of well-known techniques, such as sending a plurality of pilot symbols at the beginning of the data sector, using servo techniques to align the write head clock with the start of a bit island during the first write, etc.

Assuming that the first insertion occurred in position t, the next insertion is expected to occur in a position that is in the range [t+M−λ, t+M+λ], for a small number λ. For each insertion position, the corresponding bit is dropped and the resulting received sequence is decoded by the inner [n,k] code. That is, the inserted bit is first assumed to be in position t+M−λ. This bit is dropped, and the received sequence of bits is appropriately decoded by the inner [n, k] code. The inner [n, k] decoder produces a code word estimate with a distance metric associated with that estimate. At the next step, the inserted bit is assumed to be in position $t+M-\lambda+1$ and the resulting received sequence is decoded to produce a new code word and a new distance metric by the inner code, and so on. Thus, for each choice of insertion position, a code word and a distance metric estimate from the inner code is obtained.

Figure 7:
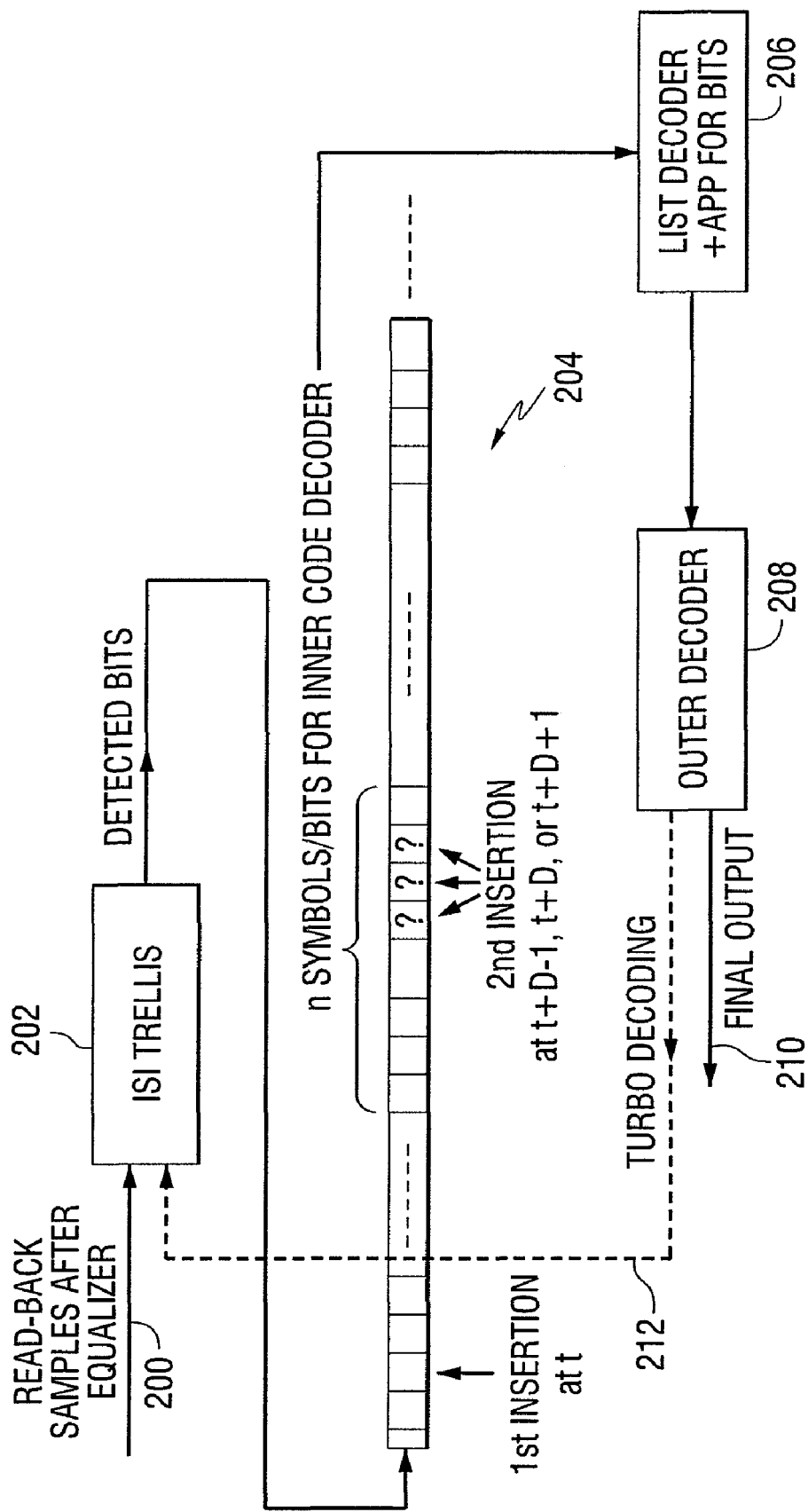
FIG. 7 is a block diagram that illustrates bit insertions and a list decoder that corrects insertion errors and bit errors.

This is illustrated in FIG. 7. The read-back signals from the equalizer on line 200 are decoded using an ISI trellis detector 202 to produce decoded bits 204. Symbols, or groups of bits, are decoded by an inner decoder 206 and the inner decoder output is decoded by an outer decoder 208 to produce the final output on line 210. If turbo style iterative decoding is used, an output of the outer decoder (or the inner decoder) is also fed back to the ISI trellis detector on line 212.

Either the most likely code word from the list of decoded words produced by the inner decoder can be chosen, or the code-bits can be further estimated by combining the distance metrics and the code words in the list using the a posteriori probability rule. Once the inner decoder completes decoding all the code words, these estimates are sent to the outer ECC decoder to further clean up any remaining errors. Thus, the outer ECC decoder sees only substitution errors in contrast to the inner decoder that sees both insertion and substitution errors.

Increasing the value of $\lambda$ improves performance of the above list decoding approach, albeit, at the cost of increased complexity. Note that the above solution can handle both insertion errors and substitution errors whether they be random substitution errors or burst of substitution errors. The value of $\lambda$ is chosen based on the position jitter and inherent timing errors in the system and based on the level of decoder complexity that can be tolerated.

Figure 8:
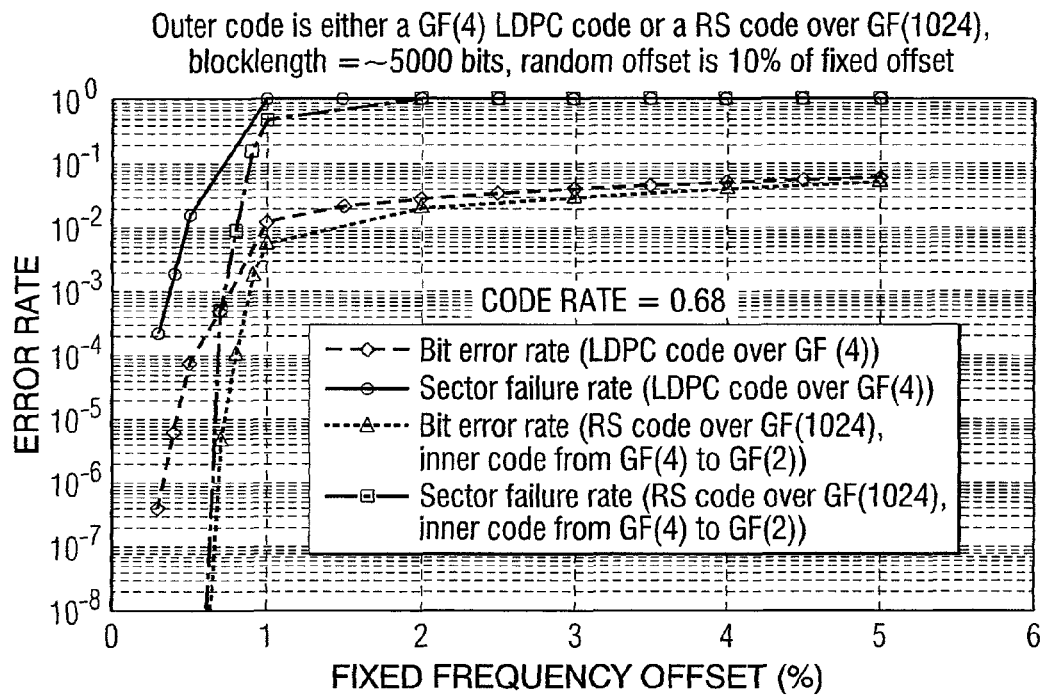
FIG. 8 is a graph of calculated results for an outer ECC=GF (4) [2592,2208] rate 0.85 low density parity check (LDPC) code or a symbol size 10 RS code of rate 0.85, an inner modulation code, and a patterned media recording system subject to writing with a fixed frequency offset and a random offset=10% of the fixed frequency offset for the channel model of FIG. 4 and FIG. 5.

FIG. 8 shows the performance of an example using the high SNR case for the aspect of the channel model of FIG. 4 and FIG. 5. The outer ECC code is either an LDPC code over GF(4) having a block length of approximately 2600 symbols (or, 5200 bits) and rate of 0.85 or an RS code of symbol size 10 and having a block length of 520 symbols (or 5200 bits) and rate 0.85. The inner modulation code maps the symbol 0 to a run of length one, the symbol 1 to a run of length two, the symbol $\alpha \epsilon GF(4)$ to a run of length three, and the symbol $\alpha^2 \epsilon GF(4)$ to a run of length four. Thus, when an RS code of symbol size 10 is used as the outer code, each output symbol from the outer code is mapped into a sequence of 5 symbols in GF(4) before encoding with the inner modulation code. Thus, the overall rate of the system in both cases is ~0.68. The standard deviation $\sigma$ for the random frequency offset in the system is set to 10% of the fixed frequency offset in the system.

The high SNR case has been simulated. That is, it is assumed that the channel detector will be able to detect all the written bits correctly. The only errors in the system are insertion errors due to the offset in the write head clock and the bit islands. The inner decoder maps run lengths back to symbols for the outer LDPC or RS decoder. The outer LDPC decoder uses a max-log-approximation to the sum-product algorithm to reduce complexity, and a maximum of 100 iterations of message passing are allowed in the LDPC decoder. No turbo decoding between the outer LDPC decoder and the inner soft output Viterbi algorithm (SOVA) detector was used in this example. The outer RS decoder uses the conventional Berlekamp-Massey hard-decision decoding. The results show the bit-error-rate performance and the sector-failure-rate performance as a function of the fixed frequency offset in the system. A frequency offset below 0.4% yields a satisfactory performance in the case of the outer LDPC code and a frequency offset below 0.8% yields a satisfactory performance in the case of the RS code. The performance in the case of an outer LDPC code may be improved further if iterative decoding between the outer LDPC decoder and an inner SOVA type detector is allowed.

To examine the list decoding approach for the low SNR case for the aspect of the channel model of FIG. 6 and FIG. 7, a magnetic recording system using a perpendicular channel response at a user bit density of 1.8, and having 90% media jitter was simulated. To simulate insertion errors, one insertion in approximately every D bits, for some value D, was simulated. The location of each insertion was assumed to be known to be in an interval of the form $[D-\lambda, D+\lambda]$. A GPR target length 5 equalizer followed by a DDNP-SOVA detector, with DDNP prediction filter length L=3, was used to detect the written bits from the read-back samples.

The following two coding schemes have been simulated. In a first coding scheme, a system having an outer [480,440] RS code of symbol size 10 was considered. The output of the RS encoder is of length 4800 bits. These bits were subdivided into groups of 150 bits each and each group was encoded by a [200,150] randomly designed binary inner LDPC code of column weight 3. Thus, the overall code rate of 0.6875 was obtained. At the decoder, the DDNP-SOVA detector passed soft information to the inner LDPC decoders. An insertion was simulated in one of {200i−101, 200i−100, 200i−99} positions, for i=1, 2 . . . . This corresponds to a fixed frequency offset of 0.5% between the write head clock and the bit island frequency, and a small random frequency offset of less than 0.025%. The inner LDPC decoders produced a list of three code words and soft information corresponding to these code words, assuming that the inserted bit was in one of {200i−101, 200i−100, 200i−99} positions, for i=1, 2, . . . , . The soft information of the bits from the list of LDPC outputs was combined using an a posteriori probability rule, and the appropriate extrinsic information was then sent back to the DDNP-SOVA detector. This process was repeated for a specified number of global iterations. The decoded bits from the LDPC decoder were then sent to the outer RS decoder for the final decoding.

As long as the LDPC decoder knows the interval of possible bits where the insertion has occurred, the list decoder will be able to decode the received bits from the SOVA detector and the performance would not change if this interval shifts from {200i−101, 200i−100, 200i−99} to {200i−101+s, 200i−100+s, 200i−99}, for any s. To simulate a 1% fixed frequency offset along with a small random frequency offset between the write clock and the bit island frequency, an insertion was introduced in one of {200i−151, 200i−150, 200i−149} bit positions and in one of {200i−51, 200i−50, 200i−49} bit positions, for i=1, 2, . . . . In this case, the LDPC decoder produced a list of at most nine decoded words.

In the second coding scheme, no attempt was made to design a system to handle the lack of write synchronization. Rather, a conventional non-iterative channel using a long RS code was used. The outer code was a [640, 440] RS code of symbol size 10 and rate 0.6875 to match the rate of the code in the first scheme. No inner code was used in this scheme. A similar recording channel as above with insertion errors is simulated.

Figure 9:
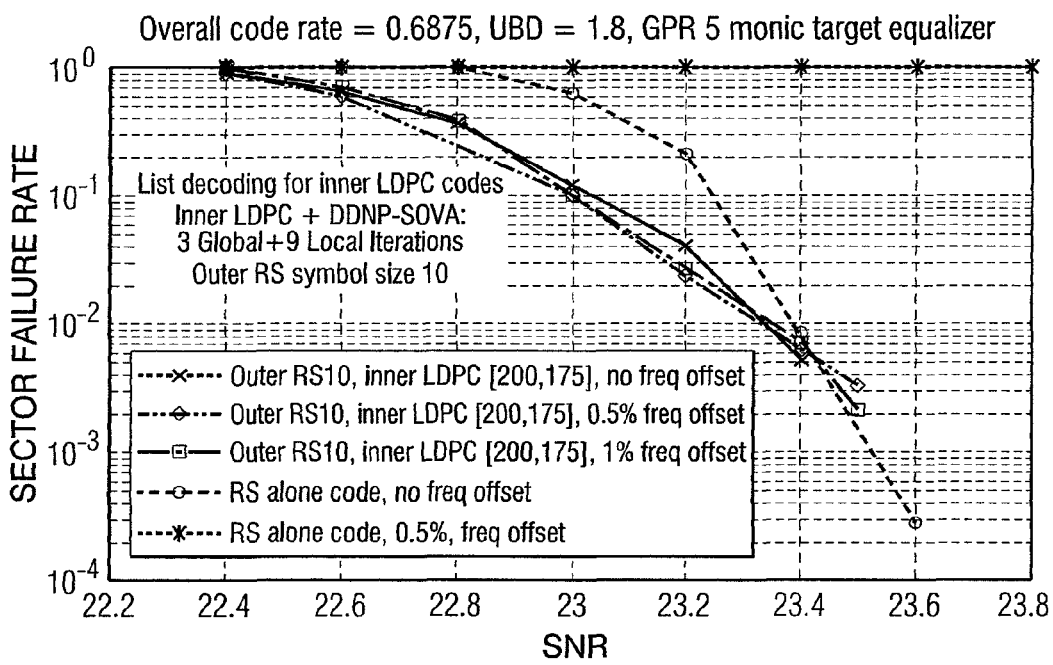
FIG. 9 is a graph of sector-failure-rate for an outer ECC=RS symbol size 10, and an inner LDPC [200,150] binary code, using a list decoding approach in the channel model of FIG. 6 and FIG. 7.
Figure 10:
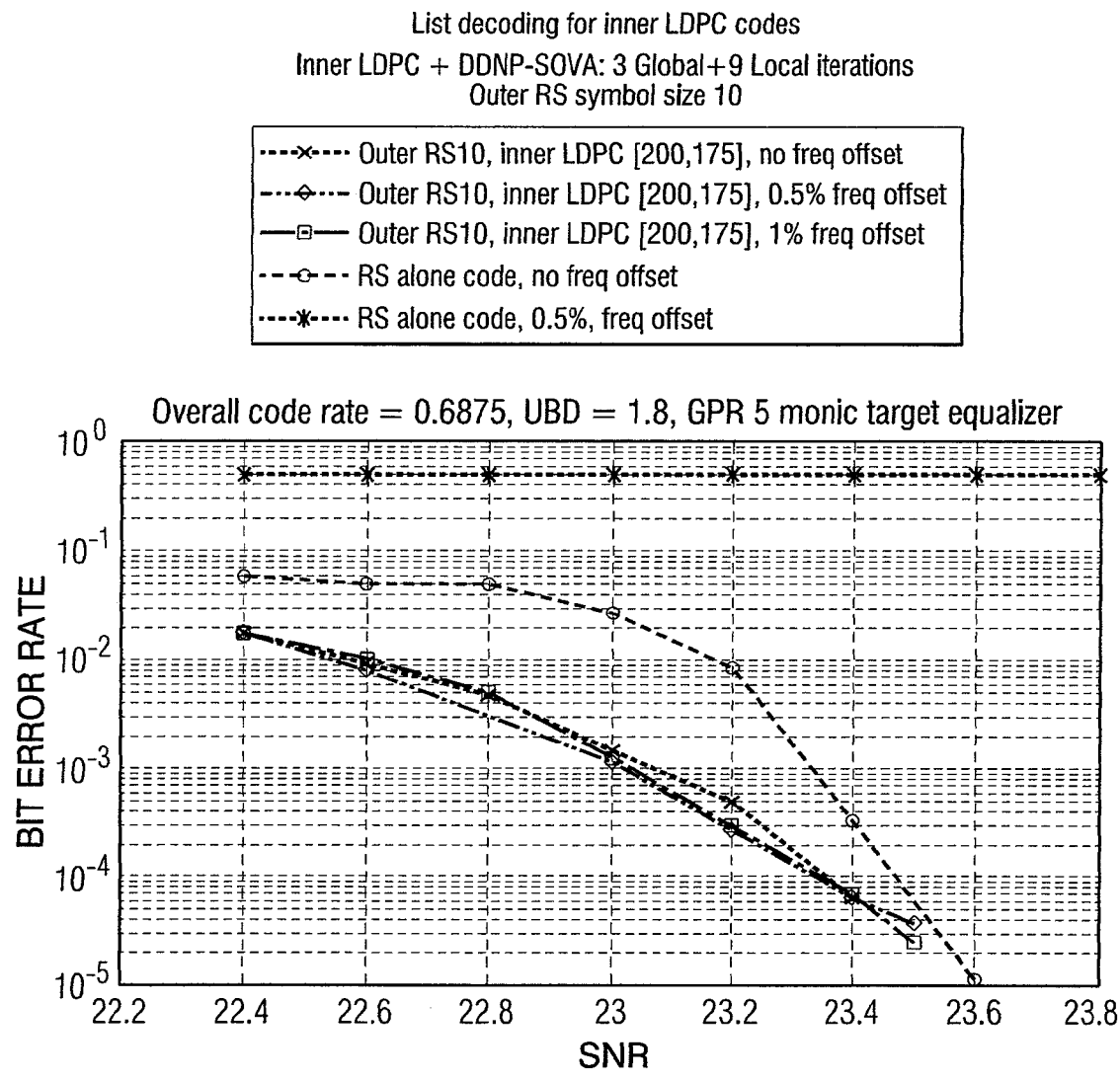
FIG. 10 is a graph of bit-error-rate performance for an outer ECC=RS symbol size 10, and an inner LDPC [200,150] binary code, using a list decoding approach in the channel model of FIG. 6 and FIG. 7.

FIGS. 9 and 10 show the sector-failure-rate and bit-error-rate performances of the two coding schemes in the channel described above. The second scheme using a single RS decoder decodes without assuming any knowledge of the insertions. Thus, when insertions occur approximately every 200 bits (i.e., corresponding to a 0.5% frequency offset), the system completely fails resulting in a bit-error-rate close to 0.5. FIGS. 9 and 10 show that the first coding scheme decodes well when there are 0%, 0.5%, and 1% frequency offsets, respectively, in the system. The system with a 0.5% frequency offset requires a list size of 3 code words per LDPC decoding, whereas the system with a frequency offset of 1% requires a list size of 9, thereby increasing the complexity of decoding.

The above approach can handle both insertion errors and any bit errors that remain after processing the read-back samples using the target ISI trellis in the SOVA detector. Further, the example described above relies on the fact that the deliberate frequency offset between the write head clock and the bit island frequency causes one insertion in approximately every D bit islands or positions, for some chosen number D.

Two coding approaches to handle the lack of write synchronization in a BPM data storage system have been described and the simulation results show that these approaches can yield a meaningful system performance in terms of bit-error-rate and sector-failure-rate. The described examples can be optimized to improve the system performance even further.

In another aspect the invention provides an apparatus that implements the above coding scheme. The apparatus can include a write channel and a read channel implemented using known circuitry, such as one or more processors that are programmed to perform the functions illustrated in the drawings and described in the above text. The circuitry can be included in a controller in the data storage device.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:

1. A method comprising:
   writing data to a bit-patterned media at times determined by a clock having a period that is offset from a bit island period by a fixed offset to create one insertion or one deletion approximately within a predetermined number of bit islands;
   reading the data; and
   correcting the read data using error correction.

2. The method of claim 1, wherein the offset is larger than a position jitter variance of the bit islands.

3. The method of claim 1, wherein the offset has a mean value equal to the bit island period divided by the predetermined number.

4. The method of claim 3, wherein the offset has a variance representative of a variance of the bit islands locations and inherent timing error in the system.

5. The method of claim 1, wherein the data to be written is subjected to an outer error correction code and an inner modulation code.

6. The method of claim 5, wherein the outer error correction code comprises one of a Reed-Soloman code, or a non-binary low-density parity-check code over $GF(2^m)$, where m is an integer, or a binary error correction code.

7. The method of claim 5, wherein the inner modulation code maps symbols to a run of zeros or ones.

8. The method of claim 1, wherein the step of correcting the read data using error correction comprises:
   mapping run lengths into symbols by an inner modulation decoder.

9. The method of claim 1, wherein the step of correcting the read data using error correction comprises:
   decoding symbols from an inner decoder by an outer ECC decoder using a decoding algorithm capable of correcting errors and erasures.

10. An apparatus comprising:
    a write channel for writing data to a bit-patterned media at times determined by a clock having a period that is offset from a bit island period by a fixed offset to create one insertion or one deletion approximately within a predetermined number of bit islands; and
    a read channel for reading the data and correcting the read data using error correction.

11. The apparatus of claim 10, wherein the offset is larger than a position jitter variance of the bit islands.

12. The apparatus of claim 10, wherein the offset has a mean value equal to the bit island period divided by the predetermined number.

13. The apparatus of claim 12, wherein the offset has a variance representative of a variance of the bit islands locations and inherent timing error in the system.

14. The apparatus of claim 10, wherein the data to be written is subjected to an outer error correction code and an inner error correction code.

15. The apparatus of claim 14, wherein the outer error correction code comprises one of a Reed-Soloman code, or a non-binary low-density parity-check code over $GF(2^m)$, where m is an integer, or a binary error correction code.

16. The apparatus of claim 14, wherein the outer error correction code comprises code word groups of length k bits/symbols and each group is encoded by an [n,k] inner binary/symbol error correction code.

17. The apparatus of claim 10, wherein the read channel uses error correction comprising list decoding for an inner code to produce a list of possible code words and corresponding reliability or distance metrics for bit insertion positions.

18. The apparatus of claim 10, wherein the read channel uses error correction comprising an inner list decoding combining a list of decoded code words and their distance metrics into one decoded word using an a posteriori probability rule.

19. The apparatus of claim 10, wherein the read channel uses error correction comprising an outer error correction code decoding an output produced by a list inner decoder using a decoding algorithm.

20. The apparatus of claim 10, wherein the read channel uses error correction comprising turbo decoding between outer or inner decoders and an inter-symbol-interference trellis detector.

* * * * *